United States Patent
Sofue et al.

(10) Patent No.: US 12,244,016 B2
(45) Date of Patent: Mar. 4, 2025

(54) ELECTRODE BINDER COMPOSITION, ELECTRODE COATING COMPOSITION, POWER STORAGE DEVICE ELECTRODE, AND POWER STORAGE DEVICE

(71) Applicant: DKS Co. Ltd., Kyoto (JP)

(72) Inventors: Ayano Sofue, Kyoto (JP); Toshiya Watanabe, Kyoto (JP); Yasuteru Saito, Kyoto (JP)

(73) Assignee: DKS CO. LTD., Kyoto (JP)

( * ) Notice: Subject to any disclaimer, the term of this patent is extended or adjusted under 35 U.S.C. 154(b) by 630 days.

(21) Appl. No.: 17/604,215

(22) PCT Filed: Mar. 5, 2020

(86) PCT No.: PCT/JP2020/009402
§ 371 (c)(1),
(2) Date: Oct. 15, 2021

(87) PCT Pub. No.: WO2020/217730
PCT Pub. Date: Oct. 29, 2020

(65) Prior Publication Data
US 2022/0200001 A1    Jun. 23, 2022

(30) Foreign Application Priority Data

Apr. 22, 2019  (JP) ................................. 2019-080601
Dec. 3, 2019   (JP) ................................. 2019-218504

(51) Int. Cl.
| | | |
|---|---|---|
| *H01M 4/62* | (2006.01) |
| *C08G 18/08* | (2006.01) |
| *C08G 18/62* | (2006.01) |
| *C08G 18/69* | (2006.01) |
| *H01G 11/06* | (2013.01) |
| *H01G 11/38* | (2013.01) |
| *B82Y 30/00* | (2011.01) |
| *B82Y 40/00* | (2011.01) |
| *H01M 4/02* | (2006.01) |
| *H01M 10/0525* | (2010.01) |

(52) U.S. Cl.
CPC ........ *H01M 4/622* (2013.01); *C08G 18/0876* (2013.01); *C08G 18/6204* (2013.01); *C08G 18/69* (2013.01); *H01G 11/06* (2013.01); *H01G 11/38* (2013.01); *H01M 4/625* (2013.01); *B82Y 30/00* (2013.01); *B82Y 40/00* (2013.01); *H01M 2004/027* (2013.01); *H01M 10/0525* (2013.01); *H01M 2300/002* (2013.01)

(58) Field of Classification Search
CPC ...... H01M 4/625; H01M 4/622; H01G 11/38; C08G 18/69; C08G 18/6204; C08G 18/0876
See application file for complete search history.

(56) References Cited

U.S. PATENT DOCUMENTS

| | | |
|---|---|---|
| 2011/0256454 A1 | 10/2011 | Nicolas et al. |
| 2016/0181616 A1 | 6/2016 | Takahashi et al. |
| 2017/0040612 A1 | 2/2017 | Komaba et al. |
| 2021/0210740 A1 | 7/2021 | Sofue et al. |

FOREIGN PATENT DOCUMENTS

| | | |
|---|---|---|
| JP | 2016-115634 A | 6/2016 |
| JP | 2016-198638 A | 11/2016 |
| JP | 2019-16457 A | 1/2019 |
| WO | WO 2015/019598 A1 | 2/2015 |
| WO | WO 2015/163302 A1 | 10/2015 |

OTHER PUBLICATIONS

English translation of JP2016196638 (Year: 2016).*
English translation of WO2015019598 (Year: 2015).*
International Preliminary Report on Patentability and English translation of the Written Opinion of the International Searching Authority for International Application No. PCT/JP2020/009402, dated Sep. 28, 2021.
International Search Report for International Application No. PCT/JP2020/009402, dated May 26, 2020.
Japanese Notice of Reasons for Refusal for Japanese Application No. 2021-513345, dated Jun. 1, 2021, with an English translation.

* cited by examiner

*Primary Examiner* — Lucas J. O'Donnell
(74) *Attorney, Agent, or Firm* — Birch, Stewart, Kolasch & Birch, LLP

(57) ABSTRACT

Provided are an electrode binder composition that provides an electrode that exhibits high durability even when an active material that shows a large volume change is used, an electrode coating liquid composition containing the electrode binder composition, a power storage device electrode including an electrode mixture layer containing a solid of the electrode coating liquid composition, and a power storage device including the power storage device electrode. An electrode binder composition includes (A) a polyurethane, (B) a fibrous nanocarbon material having an average fiber length of 0.5 μm or more, and (C) water. The polyurethane is obtained by reacting together (a) a polyisocyanate, (b) a polyol, (c) a compound having one or more active hydrogen groups and a hydrophilic group, and (d) a chain extender. (b) contains an olefinic polyol having 1.5 or more active hydrogen groups and/or a carbonate diol having less than 6 carbon atoms between carbonate bond chains.

8 Claims, No Drawings

ELECTRODE BINDER COMPOSITION, ELECTRODE COATING COMPOSITION, POWER STORAGE DEVICE ELECTRODE, AND POWER STORAGE DEVICE

TECHNICAL FIELD

The present invention relates to an electrode binder composition, an electrode coating composition containing the electrode binder composition, a power storage device electrode including an electrode mixture layer containing a solid of the electrode coating composition, and a power storage device including the electrode.

BACKGROUND ART

In recent years, power storage devices having high voltages and high energy densities have been required as power sources for driving electronic equipment. In particular, lithium ion secondary batteries, lithium ion capacitors, and the like have been expected to be high-voltage and high-energy-density power storage devices. An electrode used for such a power storage device is produced typically by apply a mixture of electrode active material particles, electrically conductive material particles, and a binder to a current collector surface and drying the mixture. Examples of power storage devices include lithium ion secondary batteries, electric double layer capacitors, and lithium ion capacitors. These power storage device are mainly composed of members such as electrodes, non-aqueous electrolyte solutions, and separators.

Of these, power storage device electrodes are formed by, for example, applying a power storage device electrode mixture liquid obtained by dispersing an electrode active material, an electrically conductive material, and a binder in an organic solvent or water to metal foil serving as a current collector surface and drying the liquid. The properties of a power storage device are greatly influenced, as a matter of course, by electrode particulate materials used and main constituent materials such as an electrolyte and a current collector and are greatly influenced also by a binder, a thickening stabilizer, and a dispersant used as additives.

In particular, in the case of an electrode, an electrode active material, a current collector, and a binder that provides adhesion between them have a great influence on the properties. For example, since the amount and type of active material used determine the amount of lithium ions that can bind to the active material, the use of a larger amount of active material with a higher intrinsic capacity can provide a battery with a higher capacity. When the binder has high adhesive strength between the active materials and between the active material and the current collector, the movement of electrons and lithium ions is facilitated in the electrode to reduce the internal resistance of the electrode, thus enabling highly efficient charge-discharge. In the case of a high capacity battery, a composite-type electrode that includes, as an anode active material, carbon and graphite, carbon and silicon, or silicon oxide is required, and volume expansion and contraction of the active material occur significantly during charge-discharge. Thus, the binder needs to not only have high adhesive strength but also have high elasticity so that the original adhesive strength and resilience can be maintained if the volume of the electrode repeatedly undergoes considerable expansion and contraction. In addition, it is desirable to uniformly disperse a conductive agent so that an electron conduction path can be retained if a change in electrode volume occurs.

As an example of the case where an active material that contains Si and shows a large volume change is used, PTL 1 has reported a case where an acrylic polymer is used as a binder. In general, an electrode including such a high-strength binder has the feature of not breaking even when a volume change of an active material occurs, but has a problem in that the flexibility of the electrode is difficult to retain and exfoliation and the like during electrode processing tend to occur. In addition, it is said that it is difficult to achieve the dispersibility and rheology controlling properties of electrode materials with an acrylic polymer alone.

CITATION LIST

Patent Literature

PTL 1: International Publication No. 2015/163302

SUMMARY OF INVENTION

Technical Problem

An object of the present invention is to provide an electrode binder composition that exhibits high durability even when an active material that shows a large volume change is used, an electrode coating composition produced using the electrode binder composition, a power storage device electrode produced using the electrode coating composition, and a power storage device including the power storage device electrode.

Solution to Problem

To achieve the above object, the present inventors conducted intensive studies. During the process of the studies, the inventors focused on a polyurethane and a fibrous nanocarbon that satisfy given requirements and found that a dispersion containing the polyurethane and the fibrous nanocarbon material solves the above problems, thereby completing the present invention.

Thus, the present invention provides the following [1] to [10].

[1] An electrode binder composition including (A) a polyurethane, (B) a fibrous nanocarbon material having an average fiber length of 0.5 μm or more, and (C) water, in which the polyurethane is obtained by reacting together (a) a polyisocyanate, (b) a polyol, (c) a compound having one or more active hydrogen groups and a hydrophilic group, and (d) a chain extender, and (b) the polyol contains an olefinic polyol having 1.5 or more active hydrogen groups and/or a carbonate diol having less than 6 carbon atoms between carbonate bond chains.

[2] The electrode binder composition according to [1], including (D) a cellulose material.

[3] The electrode binder composition according to [2], in which (D) the cellulose material includes a carboxymethylcellulose salt and/or a nanocellulose fiber.

[4] The electrode binder composition according to any one of [1] to [3], in which (B) the fibrous nanocarbon material comprises one or more selected from single-walled carbon nanotubes, multi-walled carbon nanotubes, and nanocarbon fibers.

[5] The electrode binder composition according to any one of [1] to [4], in which the content ratio of (A) the polyurethane to (B) the fibrous nanocarbon material satisfies (A) polyurethane:(B) fibrous nanocarbon=60:40 to 99.6:0.4 (mass ratio).

[6] The electrode binder composition according to any one of [1] to [5], in which the olefinic polyol includes one or more selected from polybutadiene polyol, polyisoprene polyol, hydrogenated polybutadiene polyol, and hydrogenated polyisoprene polyol.

[7] The electrode binder composition according to any one of [1] to [6], in which (a) the polyisocyanate contains an alicyclic isocyanate and/or an aromatic isocyanate.

[8] An electrode coating liquid composition including the electrode binder composition according to any one of [1] to [7].

[9] A power storage device electrode including an electrode mixture layer containing a solid of the electrode coating liquid composition according to [8].

[10] A power storage device including the power storage device electrode according to [9].

Advantageous Effects of Invention

The electrode binder composition of the present invention has flexibility and adaptability to a volume change of an electrode, and thus has high binding properties and the feature of being less likely to cause exfoliation of an electrode mixture layer during processing of the electrode. Furthermore, the power storage device provided has high discharge performance and cycle stability.

DESCRIPTION OF EMBODIMENTS

An embodiment of the present invention will now be described in detail.

An electrode binder composition (hereinafter also referred to simply as a binder composition or a binder) of the present invention contains (A) a predetermined polyurethane. (A) The polyurethane is obtained by reacting together (a) a polyisocyanate, (b) a polyol, (c) a compound having one or more active hydrogen groups and a hydrophilic group, and (d) a chain extender.

(a) Polyisocyanate
  (a) The polyisocyanate may be any polyisocyanate commonly used in this technical field. Specific examples include aliphatic polyisocyanates, alicyclic polyisocyanates, aromatic polyisocyanates, and araliphatic polyisocyanates. Examples of aliphatic polyisocyanates include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of alicyclic polyisocyanates include isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane. Examples of aromatic polyisocyanates include tolylene diisocyanate, 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, and 1,4-phenylene diisocyanate. Examples of araliphatic polyisocyanates include dialkyldiphenylmethane diisocyanate, tetraalkyldiphenylmethane diisocyanate, and α,α,α,α-tetramethylxylylene diisocyanate. Other examples include dimers and trimers of these organic polyisocyanates and modified products such as biuret isocyanate. These may be used alone or in combination of two or more.

Of (a) the polyisocyanates described above, alicyclic and/or aromatic isocyanates are preferred from the viewpoint of binding properties and electrolyte solution resistance. Specifically, 4,4'-dicyclohexylmethane diisocyanate, isophorone diisocyanate, and 1,3-bis(isocyanatomethyl) cyclohexane are preferred.

(b) Polyol
  (b) The polyol contains an olefinic polyol having, on average, 1.5 or more active hydrogen groups per molecule and/or a carbonate diol having less than 6 carbon atoms between carbonate bond chains.

The number of active hydrogen groups per molecule of the olefinic polyol is 1.5 or more on average. When the number of active hydrogen groups is 1.5 or more on average, an electrode binder composition with high durability is advantageously provided.

Examples of the olefinic polyol include polyols such as polybutadiene polyol, polyisoprene polyol, and polychloroprene polyol, hydrogenated polyols derived therefrom, polyols obtained by copolymerizing polybutadiene polyol with olefin compounds such as styrene, ethylene, vinyl acetate, and acrylates, and hydrogenated polyols derived therefrom. In particular, polybutadiene polyol, polyisoprene polyol, hydrogenated polybutadiene polyol, and hydrogenated polyisoprene polyol are preferred. These may be used alone or in combination of two or more.

The content of the component (b) in the case where a polyolefinic polyol is used as the component (b) is preferably 40 mass % or more and 90 mass % or less relative to 100 mass % of the polyurethane. When the content is in this range, particularly excellent binding properties and particularly high electrolyte solution resistance are provided.

The above polycarbonate diol has less than 6 carbon atoms between carbonate bond chains. When the number of carbon atoms between carbonate bond chains is less than 6, good affinity for an electrolyte solution is provided, and ionic conductivity is advantageously improved.

The polycarbonate diol can be obtained by performing a transesterification reaction between a carbonate and a diol and removing the formed alcohol by distillation or other means.

Examples of the diol include linear, cyclic, and branched aliphatic diols having 2 to 5 carbon atoms. More specific examples include 1,3-butanediol, 1,3-propanediol, 1,4-butanediol, 2,3-butanediol, ethylene glycol, diethylene glycol, propylene glycol, dipropylene glycol, 1,5-pentanediol, neopentyl glycol, 2-methyl-1,3-propanediol, 2,2-methyl-1,3-propanediol, 2-ethyl-1,3-propanediol, and 2,2-diethyl-1,3-propanediol. These diols may be used alone or in combination of two or more.

Examples of the carbonate include alkylene carbonates, dialkyl carbonates, and diaryl carbonates. Examples of alkylene carbonates include ethylene carbonate, trimethylene carbonate, 1,2-propylene carbonate, 1,2-butylene carbonate, 1,3-butylene carbonate, and 1,2-pentylene carbonate. Examples of dialkyl carbonates include dimethyl carbonate, diethyl carbonate, and di-n-butyl carbonate, and examples of diaryl carbonates include diphenyl carbonate. Of these, ethylene carbonate, dimethyl carbonate, diethyl carbonate, and di-n-butyl carbonate are preferably used.

Any catalyst may be used for the transesterification reaction between a carbonate and an aliphatic diol, and examples of suitable catalysts include hydroxides of alkali metals and alkaline-earth metals, such as sodium hydroxide and potassium hydroxide; metal alcoholates such as sodium methylate, potassium methylate, titanium tetraisopropylate, and zirconium tetraisopropylate; titanium compounds such as tetraisopropoxytitanium and tetra-n-butoxytitanium; and metal salts of acetic acid, such as magnesium acetate, calcium acetate, zinc acetate, and lead acetate.

The above polycarbonate diols may be used alone or in combination of two or more.

The content of the above polycarbonate diol used as the component (b) is preferably 50 mass % or more and 90 mass % or less relative to 100 mass % of the polyurethane. When the content is 50 mass % or more, particular excellent binding properties are advantageously provided, and when the content is 90 mass % or less, particularly high electrolyte solution resistance is advantageously provided.

The molecular weight of (b) the polyol is preferably 500 or more and 5,000 or less in terms of number average molecular weight. A number average molecular weight in this range advantageously provides particularly excellent binding properties, and also provides particularly high electrolyte solution resistance when the component (b) is an olefinic polyol.

In the component (b), for example, polyether, polyester, polyether ester, polycarbonate, polythioether, polyacetal, an acrylic compound, polysiloxane, a fluoro compound, or a vegetable oil compound may also be used in combination, in addition to the above-described components. More specific examples include polyhydric alcohols such as ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycol, dipropylene glycol, tripropylene glycol, 1,4-cyclohexanedimethanol, bisphenol A, bisphenol F, bisphenol S, hydrogenated bisphenol A, dibromobisphenol A, dihydroxyethyl terephthalate, hydroquinone dihydroxyethyl ether, trimethylolpropane, glycerol, and pentaerythritol; oxyalkylene derivatives thereof; ester compounds produced from these polyhydric alcohols and oxyalkylene derivatives with polycarboxylic acids, polycarboxylic acid anhydrides, or polycarboxylic acid esters; polyol compounds such as polycarbonate polyol, polycaprolactone polyol, polyester polyol, polythioether polyol, polyacetal polyol, polytetramethylene glycol, fluoropolyol, silicon polyol, acrylic polyol, dimer acid polyol, castor oil polyol, and soybean oil polyol; and modified products thereof. Examples of alkylene oxides include ethylene oxide, propylene oxide, and butylene oxide. One of them may be used in combination, or two or more of them may be used in combination. Of these, the combined use of polycarbonate polyol other than polycarbonate diol, castor oil polyol, or dimer acid polyol is preferred. The number average molecular weight of the compound used in combination is preferably 500 or more and 5000 or less.

(c) Compound Having One or More Active Hydrogen Groups and Hydrophilic Group

The component (c) is a compound having one or more active hydrogen groups and a hydrophilic group. Examples of the hydrophilic group include anionic hydrophilic groups, cationic hydrophilic group, and nonionic hydrophilic groups. Specifically, examples of anionic hydrophilic groups include a carboxyl group and salts thereof, and a sulfonic group and salts thereof. Examples of cationic hydrophilic groups include tertiary ammonium salts and quaternary ammonium salts. Examples of nonionic hydrophilic groups include groups composed of repeating units of ethylene oxide and groups composed of repeating units of ethylene oxide and repeating units of other alkylene oxides.

Examples of the compound containing one or more active hydrogen groups and a carboxyl group include compounds containing carboxylic acids such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, derivatives thereof, salts thereof, and, in addition, polyester polyols obtained using them. Other examples include amino acids such as alanine, aminobutyric acid, aminocaproic acid, glycine, glutamic acid, aspartic acid, and histidine, and carboxylic acids such as succinic acid, adipic acid, maleic anhydride, phthalic acid, and trimellitic anhydride.

Examples of the compound having one or more active hydrogen groups, a sulfonic group, and a salt thereof include compounds containing sulfonic acids such as 2-oxyethanesulfonic acid, phenolsulfonic acid, sulfobenzoic acid, sulfosuccinic acid, 5-sulfoisophthalic acid, sulfanyl acid, 1,3-phenylenediamine-4,6-disulfonic acid, and 2,4-diaminotoluene-5-sulfonic acid, derivatives thereof, and polyester polyols, polyamide polyols, and polyamide polyester polyols obtained by copolymerizing these compounds.

By neutralizing the carboxyl group or sulfonic group to form a salt, the final polyurethane can be made water dispersible. Examples of neutralizers in this case include nonvolatile bases such as lithium hydroxide, sodium hydroxide, and potassium hydroxide, tertiary amines such as trimethylamine, triethylamine, dimethylethanolamine, methyldiethanolamine, and triethanolamine, and volatile bases such as ammonia. The neutralization may be performed before, during, or after urethane-forming reaction.

Examples of the compound containing one or more active hydrogen groups and a tertiary ammonium salt include methylamino ethanol and alkanolamines such as methyldiethanolamine. By neutralizing the compound with an organic carboxylic acid such as formic acid or acetic acid or an inorganic acid such as hydrochloric acid or sulfuric acid to form a salt, the polyurethane can be made water dispersible. The neutralization may be performed before, during, or after urethane-forming reaction. Of these, for easy emulsification of the polyurethane, it is preferable to neutralize methyldiethanolamine with an organic carboxylic acid.

The compound having one or more active hydrogen groups and a quaternary ammonium salt is a compound obtained by quaternizing the above-described methylamino ethanol or alkanolamine such as methyldiethanolamine with an alkyl halide such as methyl chloride or methyl bromide or a dialkylsulfuric acid such as dimethylsulfuric acid. Of these, for easy emulsification of the polyurethane, a compound obtained by quaternizing methyldiethanolamine with dimethylsulfuric acid is preferred.

The compound having one or more active hydrogen groups and a nonionic hydrophilic group is preferably, but not necessarily, a compound containing at least 30 mass % or more of repeating units of ethylene oxide and having a number average molecular weight of 300 to 20,000. Examples include nonionic group-containing compounds such as polyoxyethylene glycol, polyoxyethylene-polyoxypropylene glycol copolymers, polyoxyethylene-polyoxybutylene glycol copolymers, polyoxyethylene-polyoxyalkylene glycol copolymers, and monoalkyl ethers thereof, and polyester polyether polyols obtained by copolymerizing these compounds.

As the component (c), the above compounds may be used alone or in combination of two or more.

For the content of the component (c), in the case of a compound containing an anionic hydrophilic group, an acid value which indicates the content of the anionic hydrophilic group is preferably 5 mgKOH/g or more. The acid value is preferably 50 mgKOH/g or less, more preferably 45 mgKOH/g or less. An acid value of 5 mgKOH/g or more advantageously provides particularly good dispersibility in water, and an acid value of 50 mgKOH/g or less advantageously provides particularly high electrolyte solution resistance. The acid value can be determined from the amount of KOH (mg) required to neutralize free carboxyl groups contained in 1 g of solids in an aqueous polyurethane dispersion, in accordance with JIS K 0070-1992. When a nonionic group-containing compound is used, it is used in an amount of preferably 1 to 30 parts by mass, more preferably 5 to 20 parts by mass, relative to 100 parts by mass of (A) the polyurethane. Of these, the component (c) is preferably a compound containing, in its molecule, one or more active hydrogen groups and a carboxyl group because good adhesion to a current collector is provided.

(d) Chain Extender

Next, (d) the chain extender may be a chain extender commonly used in this technical field. Specifically, but not necessarily, diamines and polyamines may be used. Examples of diamines include ethylenediamine, trimethylenediamine, piperazine, and isophoronediamine, and examples of polyamines include diethylenetriamine, dipropylenetriamine, and triethylenetetramine.

(A) The polyurethane of the present invention is preferably used in the state of an aqueous dispersion. The aqueous dispersion of (A) the polyurethane (hereinafter referred to as the aqueous polyurethane dispersion) can be produced by any method, and, for example, the following method is used. Without a solvent or in an organic solvent having no active hydrogen groups, (a) the polyisocyanate is reacted in an amount stoichiometrically excessive relative to the total amount of active hydrogen groups reactive with isocyanate groups contained in (b) the polyol, (c) the compound having one or more active hydrogen groups and a hydrophilic group, and (d) the chain extender, for example, in an amount such that the equivalent ratio of isocyanate groups to active hydrogen groups is 1:0.85 to 1.1, to synthesize a urethane prepolymer terminated with isocyanates, after which the anionic hydrophilic group or cationic hydrophilic group of the component (c) is neutralized or quaternized as required, and then dispersion and emulsification in water is performed. After this, fewer equivalents of (d) the chain extender than those of isocyanate groups left unreacted is added, for example, such that the equivalent ratio of the isocyanate groups to active hydrogen groups of the chain extender is 1:0.5 to 0.9, whereby the isocyanate groups in the emulsified micelle and (d) the chain extender are allowed to undergo interfacial polymerization reaction to form urea bonds. This improves the crosslink density in the emulsified micelle to form a three-dimensional crosslinked structure. The formation of such a three-dimensional crosslinked structure provides a coating film that exhibits high electrolyte solution resistance. After this, the solvent used is removed as required, whereby an aqueous polyurethane dispersion can be obtained. If a polyamine or the like is not used as the component (d), chain extension can be executed by water molecules present in the system at the time of dispersion and emulsification in water.

In the synthesis of a urethane prepolymer, a solvent that is inactive against isocyanate groups and is capable of dissolving the urethane prepolymer formed may also be used. Examples of such solvents include dioxane, methyl ethyl ketone, dimethylformamide, tetrahydrofuran, N-methyl-2-pyrrolidone, toluene, and propylene glycol monomethyl ether acetate. Such a hydrophilic organic solvent used in the reaction is preferably removed in the end.

(A) The polyurethane used may be a single one, a combination of two or more, or a composite of two or more resins.

(B) Fibrous nanocarbon material

The fibrous nanocarbon material is composed of a fibrous nanocarbon having an average fiber length of 0.5 μm or more. When the average fiber length is 0.5 μm or more, an electrode binder composition having excellent binding properties is provided, and as a result, a battery with a long cycle life is advantageously provided. The fiber width of the fibrous nanocarbon is preferably 1 nm or more and 200 nm or less. The average fiber length and the fiber width can be determined by, for example, measuring the major-axis diameter of 100 randomly selected fibrous nanocarbon materials in a transmission electron micrograph or scanning probe micrograph and calculating its arithmetic average, that is, a number-average particle size. Examples of the fibrous nanocarbon material include single-walled carbon nanotubes (SWCNTs), multi-walled carbon nanotubes (MWCNTs), and nanocarbon fibers, and SWCNTs are suitable for use in terms of the relation between amounts and effects. As the component (B), these compounds may be used alone or in combination of two or more.

(B) The fibrous nanocarbon material is preferably used in the state of being dispersed in a predetermined medium. This dispersion is prepared by dispersing (B) the fibrous nanocarbon material as a raw material in a medium to a nano size by a known method. Water is typically used as the medium, but a polar solvent, such as an alcohol or a ketone solvent, or a mixed solvent of such a polar organic solvent and water may also be used. Examples of devices for producing the dispersion of (B) the fibrous nanocarbon material include jet mills, high-pressure dispersing devices, and ultrasonic homogenizers.

For the preparation of the dispersion of (B) the fibrous nanocarbon material, the dispersion can be obtained more efficiently by adding (D) a cellulose material. Examples of (D) the cellulose material include celluloses such as hydroxymethylcellulose, carboxymethylcellulose, alkali metal salts thereof, methylcellulose, ethylcellulose, hydroxypropylmethylcellulose, and hydroxyethylmethylcellulose. In particular, sodium salt of carboxymethylcellulose is particularly suitable for use. Nanocellulose fibers having similar functions may also be used. For example, cellulose nanofibers as described in Japanese Patent No. 5626828 and Japanese Patent No. 5921960 may also be used.

In the binder composition of the present invention, the content ratio of (A) the polyurethane to (B) the fibrous nanocarbon material preferably satisfies (A) polyurethane: (B) fibrous nanocarbon material=60:40 to 99.6:0.4 (mass ratio). When the content ratio is within this range, the following advantages are provided. An electrode coating liquid composition with high coatability is obtained; a power storage device electrode with low electrical resistance in which the flexibility of an electrode layer and the binding properties of an active material, a conductive assistant, and the like are excellent is obtained; and, furthermore, a power storage device with a long battery cycle life is obtained. The amount of (D) the cellulose material added to the dispersion of (B) the fibrous nanocarbon is preferably 5 parts by mass or more and 150 parts by mass or less relative to 100 parts by mass of (B) the fibrous nanocarbon. (D) The cellulose material contained in this range advantageously improves the dispersibility and dispersion stability of (B) the nanocarbon material and enables the viscosity of an electrode coating liquid composition to be properly adjusted, thus facilitating electrode production.

The electrode coating liquid composition of the present invention contains an active material, a conductive assistant, a dispersant, and an electrode binder composition. The total content of the dispersant and the electrode binder composition is preferably 0.5 parts by mass or more and 20 parts by mass or less relative to 100 parts by mass of the solid content of the electrode coating liquid composition. In general, although depending on the characteristics of the active material used, when the content is in this range, an electrode coating liquid composition in which the electrode active material and the conductive assistant are dispersed well and which has appropriate thixotropic properties can be obtained. The content is preferably 1 part by mass or more, more preferably 1.5 parts by mass or more, and is preferably 12 parts by mass or less, more preferably 10 parts by mass or less. In the electrode coating liquid composition of the present invention, the blend ratio of the active material to the conductive assistant preferably satisfies active material:conductive assistant=88:13 to 99.5:0.5 (mass ratio), and the blend ratio of the active material to the total amount of the dispersant and the binder composition preferably satisfies active material:total amount of dispersant and binder composition=78:22 to 98:2 (mass ratio).

Other electrode binders may be added to the electrode coating liquid composition of the present invention to the extent that the advantageous effects of the present invention are not impaired. The binders may be any known binders, and, in general, water-soluble and/or water-dispersible macromolecular compounds may be used. Specific examples include, but are not limited to, polyvinylidene fluoride, polyvinylidene fluoride copolymer resins such as copolymers of polyvinylidene fluoride and hexafluoropropylene, perfluoromethyl vinyl ether, and tetrafluoroethylene, fluorocarbon resins such as polytetrafluoroethylene and fluorocarbon rubber, polymers such as styrene-butadiene rubber, ethylene-propylene rubber, and styrene-acrylonitrile copolymers, and water dispersions of polyurethane resins, acrylic resins, polyester resins, polyimide resins, polyamide resins, epoxy resins, and the like. These additives may be used alone or in combination of two or more, or a composite of two or more resins may be used.

A dispersant is added to the electrode coating liquid composition of the present invention to the extent that the advantageous effects of the present invention are not impaired. The dispersant preferably contains one or more additives having a dispersion function. The additives having a dispersion function may be any known additives. Specifically, one or more selected from celluloses such as hydroxymethylcellulose, carboxymethylcellulose, alkali metal salts thereof, methylcellulose, ethylcellulose, hydroxypropylmethylcellulose, and hydroxyethylmethylcellulose; cellulose nanofibers such as chemically modified cellulose nanofibers as described in Japanese Patent No. 5626828 and Japanese Patent No. 5921960; polycarboxylic acid compounds such as polyacrylic acid and sodium polyacrylate; compounds having a vinylpyrrolidone structure such as polyvinylpyrrolidone; and polyurethane resins, polyester resins, polyacrylamide, polyethylene oxide, polyvinyl alcohol, sodium alginate, xanthan gum, carrageenan, guar gum, agar, starch, and the like may be used. In particular, carboxymethylcellulose salts are suitable for use.

A conductive assistant is added to the electrode coating liquid composition of the present invention to the extent that the advantageous effects of the present invention are not impaired. The conductive assistant may be any electron conductive material that does not adversely affect the battery performance. Typically, carbon blacks such as acetylene black and ketjen black are used, and conductive materials such as natural graphite (e.g., scale graphite, flake graphite, and earthy graphite), artificial graphite, carbon whiskers, carbon fibers, metal (e.g., copper, nickel, aluminum, silver, and gold) powders, metal fibers, and conductive ceramic materials may also be used. These may be used alone or as a mixture of two or more. The addition amount thereof is preferably 0.5 parts by mass, more preferably 1 part by mass, relative to 100 parts by mass of the solid content of the electrode coating liquid composition. The addition amount is preferably 10 parts by weight or less, particularly preferably 4 parts by weight or less. The fibrous nanocarbon material, which is a constituent of the electrode binder composition of the present invention, can also function as a conductive assistant.

For the electrode coating liquid composition of the present invention, the method, order, etc. of mixing of the above-described electrode materials are not particularly limited. For example, a conductive assistant, a dispersant, and the binder composition may be mixed in advance and used. Examples of mixing and dispersing devices used for the mixing and dispersing treatment of the composition include, but are not limited to, homodispers, planetary mixers, propeller mixers, kneaders, homogenizers, ultrasonic homogenizers, colloid mills, bead mills, sand mills, and high-pressure homogenizers.

The power storage device of the present invention may be a known power storage device, and specific examples include, but are not limited to, a lithium secondary battery and a lithium ion capacitor.

The positive electrode active material used for a positive electrode of the lithium secondary battery is not particularly limited as long as lithium ions can be intercalated and deintercalated. Examples include metal oxides such as CuO, $Cu_2O$, $MnO_2$, $MoO_3$, $V_2O_5$, $CrO_3$, $MoO_3$, $Fe_2O_3$, $Ni_2O_3$, and $CoO_3$; composite oxides of lithium and transition metals, such as $Li_xCoO_2$, $Li_xNiO_2$, $Li_xMn_2O_4$, and $LiFePO_4$; metal chalcogenides such as $TiS_2$, $MoS_2$, and $NbSe_3$; and conductive macromolecular compounds such as polyacene, poly-p-phenylene, polypyrrole, and polyaniline.

Among the above, composite oxides of lithium and one or more selected from transition metals such as cobalt, nickel, and manganese, which are generally called high-voltage materials, are preferred in terms of lithium ion releasing properties and ease of generation of high voltages. Specific examples of composite oxides of lithium and cobalt, nickel, and manganese include $LiCoO_2$, $LiMnO_2$, $LiMn_2O_4$, $LiNiO_2$, $LiNi_xCo_{(1-x)}O_2$, and $LiMn_aNi_bCo_c$ (a+b+c=1).

Positive electrode active materials obtained by doping these lithium composite oxides with a small amount of element such as fluorine, boron, aluminum, chromium, zirconium, molybdenum, or iron and positive electrode active materials obtained by surface treating the particle surface of the lithium composite oxides with, for example, carbon, MgO, $Al_2O_3$, or $SiO_2$ may also be used. These positive electrode active materials may also be used in combination of two or more.

The negative electrode active material used for a negative electrode of the lithium secondary battery may be any known active material that can intercalate and deintercalate metallic lithium or lithium ions. For example, carbon materials such as natural graphite, artificial graphite, non-graphitizable carbon, and graphitizable carbon may be used. In addition, metal materials such as metallic lithium, alloys, and tin compounds, lithium transition metal nitrides, crystalline metal oxides, amorphous metal oxides, silicon compounds, and conductive polymers may also be used. Specific examples include $Li_4Ti_5O_{12}$ and $NiSi_5C_6$.

The electrode active material used for an electrode for an electric double layer capacitor used as the power storage device of the present invention is typically an allotrope of carbon. Specific examples of the allotrope of carbon include activated carbons, polyacenes, carbon whiskers, and graphite, and powders or fibers thereof may be used. Preferred electrode active materials are activated carbons, and specific examples include activated carbons made of phenol resins, rayon, acrylonitrile resins, pitch, and coconut shells.

For electrode active materials used for electrodes for the above lithium ion capacitor, the electrode active material used for a positive electrode of the electrodes for the lithium ion capacitor may be any material that can reversibly carry lithium ions and anions such as tetrafluoroborate. Specifically, an allotrope of carbon is typically used, and electrode active materials used in electric double layer capacitors can be widely used.

The electrode active material used for a negative electrode of the electrodes for the lithium ion capacitor is a material that can reversibly carry lithium ions. Specifically, electrode active materials used in negative electrodes of lithium ion secondary batteries can be widely used. Preferably, for example, crystalline carbon materials such as graphite and non-graphitizable carbon and the polyacene materials (PAS) described also as the positive electrode active materials above may be used. These carbon materials and PAS are used in the form obtained by carbonizing a phenol resin or the like, optionally performing activation, and then performing pulverization.

The content of the electrode active materials in the electrode coating liquid composition of the present invention is not particularly limited and is 70 parts by mass or more and 98 parts by mass or less based on 100 parts by mass of the total solids.

As current collectors for the electrode active materials used for the power storage device of the present invention, any electron conductor that produces no adverse effects in an assembled battery may be used. For example, as a positive electrode current collector, aluminum, titanium, stainless steel, nickel, baked carbon, conductive polymer, conductive glass, or, alternatively, aluminum, copper, or the like surface-treated with carbon, nickel, titanium, silver, or the like for the purpose of improving adhesiveness, conductivity, and oxidation resistance may be used. As a negative electrode current collector, copper, stainless steel, nickel, aluminum, titanium, baked carbon, conductive polymer, conductive glass, Al—Cd alloy, or, alternatively, copper or the like surface-treated with carbon, nickel, titanium, silver, or the like for the purpose of improving adhesiveness, conductivity, and oxidation resistance may be used. The surface of these current collector materials may be subjected to oxidation treatment. The shape thereof may be foil-like, film-like, sheet-like, net-like, or the shape of a formed body such as a punched or expanded body, a lath body, a porous body, or a foamed body. The thickness thereof is typically, but not necessarily, 1 to 100 μm.

The electrodes of the power storage device of the present invention can be produced by, for example, mixing together an electrode active material, a conductive assistant, a current collector for the electrode active material, a binder that binds the electrode active material and the conductive assistant to the current collector, etc. to prepare a slurry electrode material, applying the electrode material to aluminum foil, copper foil, or the like serving as the current collector, and volatilizing a dispersion medium.

The method, order, etc. of mixing of the above electrode materials are not particularly limited. For example, the active material and the conductive assistant may be mixed in advance and used, and for the mixing in this case, a mortar, a mill mixer, a ball mill such as a planetary ball mill or a shaker ball mill, a mechanofusion, or the like may be used.

The separator used for the power storage device of the present invention may be any separator used for commonly used power storage devices, and examples thereof include porous resins made of polyethylene, polypropylene, polyolefin, polytetrafluoroethylene, and the like, ceramics, and nonwoven fabrics.

The electrolyte solution used for the power storage device of the present invention may be any electrolyte solution used for commonly used power storage devices, and commonly used electrolyte solutions such as organic electrolyte solutions and ion liquids may be used. Examples of electrolyte salts used for the power storage device of the present invention include $LiPF_6$, $LiBF_4$, $LiClO_4$, $LiAsF_6$, LiCl, LiBr, $LiCF_3SO_3$, $LiN(CF_3SO_2)_2$, $LiC(CF_3SO_2)_3$, LiI, $LiAlCl_4$, $NaClO_4$, $NaBF_4$, and NaI, and, in particular, inorganic lithium salts such as $LiPF_6$, $LiBF_4$, $LiClO_4$, and $LiAsF_6$ and organic lithium salts represented by $LiN(SO_2C_xF_{2x+1})(SO_2C_yF_{2y+1})$ may be used. Here, x and y each represent 0 or an integer of 1 to 4, and x+y is 2 to 8. Specific examples of organic lithium salts include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$. In particular, the use of $LiPF_6$, $LiBF_4$, $LiN(CF_3SO_2)_2$, $LiN(SO_2F)_2$, or $LiN(SO_2C_2F_5)_2$ as the electrolyte advantageously provide excellent electrical properties. These electrolyte salts may be used alone or in combination of two or more. It is desired that these lithium salts be contained in the electrolyte solution at a concentration of typically 0.1 to 2.0 mol/L, preferably 0.3 to 1.5 mol/L.

The organic solvent for dissolving the electrolyte salt used for the power storage device of the present invention may be any organic solvent used for a non-aqueous electrolyte solution of a power storage device, and examples include carbonate compounds, lactone compounds, ether compounds, sulfolane compounds, dioxolane compounds, ketone compounds, nitrile compounds, and halogenated hydrocarbon compounds. Specific examples include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones such as γ-butyl lactone; ethers such as dimethoxyethane, tetrahydrofuran, 2-methyltetrahydrofuran, tetrahydropyran, and 1,4-dioxane; sulfolanes such as sulfolane and 3-methylsulfolane; dioxolanes such as 1,3-dioxolane; ketones such as 4-methyl-2-pentanone; nitriles such as acetonitrile, propionitrile, valeronitrile, and benzonitrile; halogenated hydrocarbons such as 1,2-dichloroethane; and other ionic liquids such as methyl formate, dimethylformamide, diethylformamide, dimethylsulfoxide, imidazolium salts, and quaternary ammonium salts. Furthermore, mixtures thereof may be used. Of these organic solvents, in particular, one or more non-aqueous solvents selected from the group consisting of carbonates are preferably contained because high electrolyte solvency, high permittivity, and high viscosity are provided.

When used for a polymer electrolyte or a macromolecular gel electrolyte in the power storage device of the present invention, a macromolecule or a crosslinked body thereof having a polymer or copolymer structure, which is a macromolecular compound, of ether, ester, siloxane, acrylonitrile, vinylidene fluoride, hexafluoropropylene, acrylate, methacrylate, styrene, vinyl acetate, vinyl chloride, oxetane, etc. may be used, and one kind or two or more kinds of macromolecules may be used. The macromolecular structure is particularly preferably, but not necessarily, a macromolecule having an ether structure, such as polyethylene oxide. Inorganic matter such as a metal oxide may also be used in combination. Any metal oxide used for a power storage device may be used, and examples include $SiO_2$, $Al_2O_3$, A100H, MgO, CaO, $ZrO_2$, $TiO_2$, $Li_7La_3Zr_2O_{12}$, and $Li_{xa}La_{ya}TiO_3$ [xa=0.3 to 0.7, ya=0.3 to 0.7], and $BaTiO_3$.

In the power storage device of the present invention, in the case of a liquid-type battery, an electrolyte solution is encased in a battery container; in the case of a gel-type battery, a precursor solution of a polymer dissolved in an electrolyte solution is encased in a battery container; and in the case of a solid electrolyte battery, an uncrosslinked polymer in which an electrolyte salt is dissolved is encased in a battery container.

The power storage device according to the present invention can be formed into any desired shape such as cylindrical, coin, prism, laminate, and other shapes. The basic configuration of the battery does not vary depending on the shape, and the design can be changed depending on the purpose. For example, a cylindrical battery is obtained as follows: a negative electrode obtained by applying a negative electrode active material to a negative electrode current collector and a positive electrode obtained by applying a positive electrode active material to a positive electrode current collector are wound with a separator interposed therebetween, the resulting wound body is encased in a battery can, a non-aqueous electrolyte solution is injected into the battery can, and the battery can is sealed with insulating plates mounted on upper and lower parts. In the case of a coin battery, a stack of a disk-like negative electrode, a separator, a disk-like positive electrode, and a stainless steel plate is encased in a coin-shaped battery can, a non-aqueous electrolyte solution is injected into the battery can, and the battery can is sealed.

EXAMPLES

Next, Examples will be described together with Comparative Examples. It should be noted that the present invention is not limited to these Examples. In Examples, means % by mass, unless otherwise specified.

[Synthesis of Aqueous Dispersion of Polyurethane]

(Synthesis Example 1-1) Synthesis of Aqueous Polyurethane Dispersion A-1

In a four-necked flask equipped with a stirrer, a reflux condenser, a thermometer, and a nitrogen inlet tube, 71.3 parts by mass of polybutadiene polyol (PolybdR-45HT manufactured by Idemitsu Kosan Co., Ltd., average hydroxyl value: 46.5 mgKOH/g, active hydrogen group number: 2.32), 4.2 parts by mass of dimethylolpropionic acid (active hydrogen group number: 2), 24.5 parts by mass of dicyclohexylmethane diisocyanate, and 100 parts by mass of methyl ethyl ketone were placed and reacted together at 75° C. for 4 hours, to obtain a solution of a urethane prepolymer in methyl ethyl ketone having a free isocyanate group content of 2.5% relative to non-volatile matter. This solution was cooled to 45° C., neutralized by adding 1.25 parts by mass of sodium hydroxide, and then emulsified and dispersed using a homogenizer while gradually adding 300 parts by mass of water. Subsequently, a dilute solution of 1.6 parts by mass of ethylenediamine (active hydrogen group number: 2) in 100 parts by mass of water was added, and a chain extension reaction was performed for 1 hour. The resulting solution was desolvated under reduced pressure with heating at 50° C. to obtain an aqueous polyurethane dispersion A-1 having a non-volatile content of about 30%.

(Synthesis Example 1-2) Synthesis of Aqueous Polyurethane Dispersion A-2

In a four-necked flask equipped with a stirrer, a reflux condenser, a thermometer, and a nitrogen inlet tube, 73.9 parts by mass of hydrogenated polybutadiene polyol (KRASOL HLBH-P3000 manufactured by CREY VALLEY, average hydroxyl value: 31.0 mgKOH/g, active hydrogen group number: 1.90), 4.6 parts by mass of dimethylolpropionic acid (active hydrogen group number: 2), 21.5 parts by mass of dicyclohexylmethane diisocyanate, and 100 parts by mass of methyl ethyl ketone were placed and reacted together at 75° C. for 4 hours, to obtain a solution of a urethane prepolymer in methyl ethyl ketone having a free isocyanate group content of 2.1% relative to non-volatile matter. This solution was cooled to 45° C., neutralized by adding 3.5 parts by mass of triethylamine, and then emulsified and dispersed using a homogenizer while gradually adding 300 parts by mass of water. Subsequently, a dilute solution of 1.5 parts by mass of diethylenetriamine (active hydrogen group number: 3) in 100 parts by mass of water was added, and a chain extension reaction was performed for 1 hour. The resulting solution was desolvated under reduced pressure with heating at 50° C. to obtain an aqueous polyurethane dispersion 1B having a non-volatile content of about 30%.

(Synthesis Example 1-3) Synthesis of Aqueous Polyurethane Dispersion A-3

In a four-necked flask equipped with a stirrer, a reflux condenser, a thermometer, and a nitrogen inlet tube, 34.0 parts by mass of polybutadiene polyol (PolybdR-45HT manufactured by Idemitsu Kosan Co., Ltd., average hydroxyl value: 46.5 mgKOH/g, active hydrogen group number: 2.32), 34.0 parts by mass of polycarbonate polyol (ETERNACOLL UH-100 manufactured by Ube Industries, Ltd., average hydroxyl value: 110.0 mgKOH/g, active hydrogen group number: 2.0), 4.2 parts by mass of dimethylolpropionic acid (active hydrogen group number: 2), 27.8 parts by mass of dicyclohexylmethane diisocyanate, and 100 parts by mass of methyl ethyl ketone were placed and reacted together at 75° C. for 4 hours, to obtain a solution of a urethane prepolymer in methyl ethyl ketone having a free isocyanate group content of 2.0% relative to non-volatile matter. This solution was cooled to 45° C., neutralized by adding 3.13 parts by mass of triethylamine, and then emulsified and dispersed using a homogenizer while gradually adding 300 parts by mass of water. Subsequently, a dilute solution of 1.3 parts by mass of ethylenediamine (active hydrogen group number: 2) in 100 parts by mass of water was added, and a chain extension reaction was performed for 1 hour. The resulting solution was desolvated under reduced pressure with heating at 50° C. to obtain an aqueous polyurethane dispersion 1C having a non-volatile content of about 30%.

(Synthesis Example 1-4) Synthesis of Aqueous Polyurethane Dispersion A-4

In a four-necked flask equipped with a stirrer, a reflux condenser, a thermometer, and a nitrogen inlet tube, 51.3 parts by mass of polycarbonate polyol (ETERNACOLL UH-100 manufactured by Ube Industries, Ltd., average hydroxyl value: 112.2 mgKOH/g, active hydrogen group number: 2.0), 5.1 parts by mass of dimethylolpropionic acid (active hydrogen group number: 2), 2.6 parts by mass of trimethylolpropane (active hydrogen group number: 2), 41.0 parts by mass of dicyclohexylmethane diisocyanate, and 100 parts by mass of methyl ethyl ketone were placed and reacted together at 75° C. for 4 hours, to obtain a solution of a urethane prepolymer in methyl ethyl ketone having a free isocyanate group content of 3.0% relative to non-volatile matter. This solution was cooled to 45° C., neutralized by adding 3.8 parts by mass of triethylamine, and then emulsified and dispersed using a homogenizer while gradually adding 300 parts by mass of water. Subsequently, a dilute solution of 1.9 parts by mass of ethylenediamine (active hydrogen group number: 2) in 100 parts by mass of water was added, and a chain extension reaction was performed for 1 hour. The resulting solution was desolvated under reduced pressure with heating at 50° C. to obtain an aqueous polyurethane dispersion 1D having a non-volatile content of about 30%.

The weight of the non-volatile matter of the aqueous polyurethane dispersions obtained was measured in accordance with JIS K 6828-1: 2003.

[Preparation of Fibrous Nanocarbon Material Dispersion]

(Synthesis Example 2-1) Preparation of Fibrous Nanocarbon Dispersion B-1 (for Examples)

In a beaker, 1.0 g of a SWCNT (TUBALL BATT manufactured by OCSiAl, CNT purity: >93%, average diameter: 1.6±0.5 nm) and 50 g of a 2 wt % aqueous solution of a carboxymethylcellulose salt (CELLOGEN 7A manufactured by DKS Co., Ltd.) were mixed together and stirred, after which a Nihonseiki Kaisha US-600T ultrasonic homogenizer with a circulation unit and a tube pump were connected to the beaker, and the slurry was dispersed at a current of 100 uA for 90 minutes while being circulated to obtain a fibrous nanocarbon dispersion B-1.

(Synthesis Example 2-2) Preparation of Fibrous Nanocarbon Dispersion B-2 (for Examples)

In a beaker, 1.0 g of a SWCNT (TUBALL BATT manufactured by OCSiAl, CNT purity: >93%, average diameter: 1.6±0.5 nm), 45 g of a 2 wt % aqueous solution of a carboxymethylcellulose salt (CELLOGEN 7A manufactured by DKS Co., Ltd.), and 5 g of a 2 wt % aqueous solution of a cellulose nanofiber (RHEOCRYSTA I-2SX-LDS manufactured by DKS Co., Ltd.) were mixed together and stirred, after which a Nihonseiki Kaisha US-600T ultrasonic homogenizer with a circulation unit and a tube pump were connected to the beaker, and the slurry was dispersed at a current of 100 uA for 90 minutes while being circulated to obtain a fibrous nanocarbon dispersion B-2.

(Synthesis Example 2-3) Preparation of Fibrous Nanocarbon Dispersion B-3 (for Examples)

In a beaker, 1.0 g of a SWCNT (TUBALL BATT manufactured by OCSiAl, carbon purity: >99%, average diameter: 1.6±0.5 nm) and 50 g of a 2 wt % aqueous solution of a carboxymethylcellulose salt (CELLOGEN 7A manufactured by DKS Co., Ltd.) were mixed together and stirred, after which a Nihonseiki Kaisha US-600T ultrasonic homogenizer with a circulation unit and a tube pump were connected to the beaker, and the slurry was dispersed at a current of 100 uA for 120 minutes while being circulated to obtain a fibrous nanocarbon dispersion B-3.

(Synthesis Example 2-4) Preparation of Fibrous Nanocarbon Dispersion B-4 (for Examples)

In a beaker, 1.0 g of a MWCNT (Flotube 9110 manufactured by CNano Technology, carbon purity: >99%, average diameter: 10 to 15 nm) and 30 g of a 2 wt % aqueous solution of a carboxymethylcellulose salt (CELLOGEN 7A manufactured by DKS Co., Ltd.) were mixed together and stirred, after which a Nihonseiki Kaisha US-600T ultrasonic homogenizer with a circulation unit and a tube pump were connected to the beaker, and the slurry was dispersed at a current of 100 uA for 60 minutes while being circulated to obtain a fibrous nanocarbon dispersion B-4.

(Synthesis Example 2-5) Preparation of Fibrous Nanocarbon Dispersion B-5 (for Examples)

In a beaker, 1.0 g of a MWCNT (Flotube 9110 manufactured by CNano Technology, carbon purity: >99%, average fiber diameter: 10 to 15 nm) and 30 g of a 2 wt % aqueous solution of a carboxymethylcellulose salt (CELLOGEN 7A manufactured by DKS Co., Ltd.) were mixed together and stirred, after which a Nihonseiki Kaisha US-600T ultrasonic homogenizer with a circulation unit and a tube pump were connected to the beaker, and the slurry was dispersed at a current of 100 uA for 120 minutes while being circulated to obtain a fibrous nanocarbon dispersion B-5.

(Synthesis Example 2-6) Preparation of Fibrous Nanocarbon Dispersion B-6 (for Examples)

In a beaker, 4.0 g of a carbon fiber (VGCF-H manufactured by Showa Denko K.K., average fiber diameter: ~150 nm), 10.5 g of a 2 wt % aqueous solution of a carboxymethylcellulose salt (CELLOGEN 7A manufactured by DKS Co., Ltd.), and 5.3 g of a 2 wt % aqueous solution of a cellulose nanofiber (RHEOCRYSTA I-2SX-LDS manufactured by DKS Co., Ltd.) were stirred at 1600 rpm for 90 minutes using a Homodisper (manufactured by PRIMIX Corporation) to obtain a fibrous nanocarbon dispersion B-6.

(Synthesis Example 2-7) Preparation of Fibrous Nanocarbon Dispersion B'-1 (for Comparative Examples)

A fibrous nanocarbon dispersion B'-1 was prepared in the same manner as in Synthesis Example 2-1 except that the conditions of the treatment with the ultrasonic homogenizer were changed to 200 uA and 240 minutes.

(Synthesis Example 2-8) Preparation of Fibrous Nanocarbon Dispersion B'-2 (for Comparative Examples)

A fibrous nanocarbon dispersion B'-2 was prepared in the same manner as in Synthesis Example 2-4 except that the conditions of the treatment with the ultrasonic homogenizer were changed to 200 uA and 240 minutes.

[Evaluation of Fibrous Nanocarbon Dispersions]

The average fiber width and the average fiber length of the fibrous nanocarbon dispersions were observed using a scanning probe microscope (SPM) (AFM-5300E manufactured by JEOL Ltd.). Specifically, each fibrous nanocarbon dispersion was diluted to a solid concentration of 0.01 wt % and then cast on a mica substrate. An AFM image of the dried sample was observed, and the average fiber width and the average fiber length were determined according to the above-described method. Using these values, an aspect ratio was calculated by formula 1 below.

Aspect ratio=average fiber length (nm)/average fiber width (nm)   (formula 1)

As shown in Table 1, the fibrous nanocarbon dispersions B-1 to B-6 for Examples had an average fiber width in the range of 1 to 200 nm and an average fiber length of 0.5 μm or more. By contrast, the cellulose fibers B'-1 and B'-2 for Comparative Examples had an average fiber length out of the above range.

TABLE 1

|  | B-1 | B-2 | B-3 | B-4 | B-5 | B-6 | B'-1 | B'-2 |
|---|---|---|---|---|---|---|---|---|
| Average fiber width [nm] | 3 | 3 | 2 | 20 | 15 | 150 | 2 | 15 |
| Average fiber length [nm] | 3000 | 3200 | 1500 | 1500 | 800 | 2500 | 400 | 300 |
| Aspect ratio | 1000 | 1067 | 750 | 75 | 53 | 17 | 200 | 20 |

[Fabrication of Coating and Electrode]

For Examples (Negative Electrode 1)

A mixture of 95 parts of SiO (average particle size: 4.5 μm, specific surface area: 5.5 m$^2$/g) and graphite (average particle size: 18 μm, specific surface area: 3.2 m$^2$/g) (content ratio: 20/80, C-1 in Table 2) serving as a negative electrode active material, 2 parts of acetylene black (Li-400 manufactured by Denka Company Limited, D-1 in Table 2) serving as a conductive assistant, 0.8 parts of a carboxymethylcellulose salt (WS-C manufactured by DKS Co., Ltd., E-1 in Table 2) serving as a dispersant and binder, 2 parts (on a solid basis) of the aqueous polyurethane dispersion A-1 serving as a binder composition, and 0.2 parts (on a solid basis) of the fibrous nanocarbon dispersion B-1 was stirred with a homodisper to prepare a negative electrode slurry so as to have a solid content of 40%. The negative electrode slurry was applied to electrolytic copper foil with a thickness of 10 μm by using a roll coater (manufactured by Thank-Metal Co., Ltd., product name: Micro Coater), dried at 120° C., and then roll-pressed to obtain a negative electrode 1 with a negative electrode active material weight of 7 to 8 mg/cm$^2$.

(Negative Electrodes 2 to 4)

Negative electrodes 2 to 4 were fabricated in the same manner as the negative electrode 1 except that the aqueous polyurethane dispersion was replaced with A-2 to A-4.

(Negative Electrode 5)

A negative electrode 5 was fabricated in the same manner as the negative electrode 3 except that the fibrous carbon B-1 was replaced with the fibrous carbon B-2 shown in Table 1.

(Negative Electrode 6)

A negative electrode 6 was fabricated in the same manner as the negative electrode 5 except that 0.7 parts of the carboxymethylcellulose salt (WS-C manufactured by DKS Co., Ltd.) and 0.1 parts (on a solid basis) of a cellulose nanofiber (RHEOCRYSTA I-2SX manufactured by DKS Co., Ltd., 2 wt %) were used as a dispersant and binder (E-2 in Table 2).

(Negative Electrode 7)

A negative electrode 7 was fabricated in the same manner as the negative electrode 3 except that the fibrous carbon B-1 was replaced with the fibrous carbon B-3 shown in Table 1.

(Negative Electrode 8)

A negative electrode 8 was fabricated in the same manner as the negative electrode 7 except that the fibrous carbon B-3 was replaced with 0.5 parts (on a solid basis) of the fibrous carbon B-4 shown in Table 1 and the amount of acetylene black serving as a conductive assistant was changed to 1.6 parts.

(Negative Electrodes 9 and 10)

Negative electrodes 9 and 10 were fabricated in the same manner as the negative electrode 8 except that the fibrous carbon B-4 was replaced with the fibrous carbons B-5 and B-6 shown in Table 1, respectively.

(Negative Electrode 11)

A negative electrode 11 with a negative electrode active material weight of 8 to 9 mg/cm$^2$ was fabricated in the same manner as the negative electrode 3 except that 96 parts of SiO (average particle size: 4.5 μm, specific surface area: 5.5 m$^2$/g) and graphite (average particle size: 18 μm, specific surface area: 3.2 m$^2$/g) (content ratio: 10/90, hereinafter referred to as C-2) were used as a negative electrode active material, 1.5 parts of acetylene black were used as a conductive assistant, and 1.5 parts (on a solid basis) of the aqueous polyurethane dispersion A-3 were used as a binder composition.

(Negative Electrode 12)

A negative electrode 12 with a negative electrode active material weight of 5 to 6 mg/cm$^2$ was fabricated in the same manner as the negative electrode 3 except that 92 parts of SiO (average particle size: 4.5 μm, specific surface area: 5.5 m$^2$/g) and graphite (average particle size: 18 μm, specific surface area: 3.2 m$^2$/g) (content ratio: 30/70, hereinafter referred to as C-3) were used as a negative electrode active material, 2.5 parts of acetylene black were used as a conductive assistant, 1.3 parts of the carboxymethylcellulose salt were used as a dispersant and binder, and 4 parts (on a solid basis) of the aqueous polyurethane dispersion A-3 were used as a binder composition.

(Negative Electrode 13)

A negative electrode 13 was fabricated in the same manner as the negative electrode 3 except that 92 parts of SiO (average particle size: 7 μm, specific surface area: 2.2 m$^2$/g) and graphite (average particle size: 18 μm, specific surface area: 3.2 m$^2$/g) (content ratio: 20/80, hereinafter referred to as C-4) were used as a negative electrode active material, 1.8 parts of the carboxymethylcellulose salt were used as a dispersant and binder, and 4 parts (on a solid basis) of the aqueous polyurethane dispersion A-3 were used as a binder composition.

(Negative Electrode 14)

A negative electrode 14 with a negative electrode active material weight of 4 to 5 mg/cm$^2$ was fabricated in the same manner as the negative electrode 3 except that 92 parts of SiO (average particle size: 7 μm, specific surface area: 2.2 m$^2$/g) and graphite (average particle size: 18 μm, specific surface area: 3.2 m$^2$/g) (content ratio: 60/40, hereinafter referred to as C-5) were used as a negative electrode active material, 0.8 parts of the carboxymethylcellulose salt were used as a dispersant and binder, and 6 parts (on a solid basis) of the aqueous polyurethane dispersion A-3 were used as a binder composition.
(Negative Electrode 15)
A negative electrode 15 with a negative electrode active material weight of 4 to 5 mg/cm$^2$ was fabricated in the same manner as the negative electrode 3 except that 89 parts of SiO (average particle size: 7 µm, specific surface area: 2.2 m$^2$/g, hereinafter referred to as C-6) were used as a negative electrode active material, 0.8 parts of the carboxymethylcellulose salt were used as a dispersant and binder, and 9 parts (on a solid basis) of the aqueous polyurethane dispersion A-3 were used as a binder composition.
(Negative Electrode 16)
A negative electrode 16 with a negative electrode active material weight of 5 to 6 mg/cm$^2$ was fabricated in the same manner as the negative electrode 3 except that 94 parts of Si (average particle size: 2.6 µm, specific surface area: m$^2$/g) and graphite (average particle size: 18 µm, specific surface area: 3.2 m$^2$/g) (content ratio: 10/90, C-7 in Table 2) were used as a negative electrode active material, and 3 parts (on a solid basis) of the aqueous polyurethane dispersion A-3 were used as a binder composition.
(Negative Electrode 17)
A negative electrode 17 with a negative electrode active material weight of 5 to 6 mg/cm$^2$ was fabricated in the same manner as the negative electrode 3 except that 93 parts of Si (average particle size: 10 nm, specific surface area: m$^2$/g) and graphite (average particle size: 18 µm, specific surface area: 3.2 m$^2$/g) (content ratio: 10/90, C-8 in Table 2) were used as a negative electrode active material, 2.3 parts of acetylene black were used as a conductive assistant, 1.0 parts of the carboxymethylcellulose salt were used as a dispersant and binder, and 3.5 parts (on a solid basis) of the aqueous polyurethane dispersion A-3 were used as a binder composition.

For Comparative Examples (Negative Electrode 18)
A negative electrode 18 was fabricated in the same manner as the negative electrode 1 except that the fibrous carbon B-1 was replaced with the fibrous carbon B'-1 shown in Table 1.
(Negative Electrode 19)
A negative electrode 19 was fabricated in the same manner as the negative electrode 8 except that the fibrous carbon B-4 was replaced with the fibrous carbon B'-2 shown in Table 1, and the aqueous polyurethane dispersion A-3 serving as a binder composition was replaced with the aqueous polyurethane dispersion A-1.
(Negative Electrode 20)
A negative electrode 20 was fabricated in the same manner as the negative electrode 16 except that conditions under which the fibrous carbon B'-1 was not used were employed, 2.1 parts of acetylene black were used as a conductive assistant, and 0.9 parts of the carboxymethylcellulose salt were used as a dispersant and binder.
(Negative Electrode 21)
A negative electrode 21 was fabricated in the same manner as the negative electrode 18 except that the conductive assistant for use was changed from acetylene black to Super-P (manufactured by Imerys, D-2 in Table 2).

(Negative Electrode 22)
A negative electrode 22 was fabricated in the same manner as the negative electrode 4 except that 90.5 parts of SiO (average particle size: 4.5 µm, specific surface area: 5.5 m$^2$/g) and graphite (average particle size: 18 µm, specific surface area: 3.2 m$^2$/g) (content ratio: 20/80) were used as a negative electrode active material, 1.3 parts of acetylene black were used as a conductive assistant, 1.3 parts of the carboxymethylcellulose salt were used as a dispersant and binder, and 6 parts of a polyacrylic acid sodium salt A'-1 (molecular weight Mw=130,000) were used as a binder composition in place of 1.5 parts (on a solid basis) of the aqueous polyurethane dispersion A-3.
(Fabrication of Positive Electrode for Evaluation)
One hundred parts by mass of LiNi$_{1/3}$Co$_{1/3}$Mn$_{1/3}$O$_2$ (NCM), a positive electrode active material, 7.8 parts by mass of acetylene black (Li-400 manufactured by Denka Company Limited) serving as a conductive assistant, 6 parts by mass of polyvinylidene fluoride serving as a binder, and 61.3 parts by mass of N-methyl-2-pyrrolidone serving as a dispersion medium were mixed together using a planetary mixer to prepare a positive electrode slurry so as to have a solid content of 65%. The positive electrode slurry was applied to aluminum foil with a thickness of 15 µm by using a coating machine, dried at 130° C., and then roll-pressed to obtain a positive electrode with a positive electrode active material weight of 22 mg/cm$^2$.
(Electrode Binding Properties Evaluation)
An evaluation was performed according to the following evaluation method and evaluation criteria. The results are shown in Table 2.
(Binding Properties Evaluation)
Each of the electrodes obtained above was bent by 180° with its coated surface facing outward and unbent, after which the degree of falling off of the active material on the coated surface was judged by visual observation.
(Evaluation Criteria)
Score 5: 0% fell off
Score 4: 25% fell off
Score 3: 50% fell off
Score 2: 75% fell off
Score 1: 100% fell off
[Fabrication of Lithium Secondary Battery]
The positive electrode and each negative electrode obtained above were combined as shown in Table 2 below. The electrodes were stacked on top of each other with a polyolefin (PE/PP/PE) separator interposed therebetween, and a positive electrode terminal and a negative electrode terminal were ultrasonically welded to the positive electrode and the negative electrode, respectively. The stack was placed in an aluminum laminate package, and the package was heat-sealed except for an opening for electrolyte injection. A battery before electrolyte injection with a positive electrode area of 18 cm$^2$ and a negative electrode area of 19.8 cm$^2$ was fabricated. Next, an electrolyte solution obtained by dissolving LiPF$_6$ (1.0 mol/L) in a mixed solvent of ethylene carbonate and diethyl carbonate (30/70 by volume) was injected, and the opening was heat-sealed to obtain a battery for evaluation.
[Evaluation of Battery Performance]
The lithium secondary batteries fabricated were subjected to a performance test at 20° C. The test method is as described below. The test results are shown in Table 2.
(Charge-Discharge Cycle Characteristics)
The charge-discharge cycle characteristics were measured under the following conditions. A cycle of CC (constant current) charging at a current density corresponding to 0.5 C to 4.2 V, switching to CV (constant voltage) charging at 4.2 V and performing charging for 1.5 hours, and CC discharging at a current density corresponding to 0.5 C to 2.7 V was performed 300 times at 20° C., and the ratio of a 1 C discharge capacity after the 300 cycles to a 0.5 C discharge capacity at the first cycle was determined as a 0.5 C charge-discharge cycle retention.

(Cell Impedance)

For an evaluation cell impedance after the first charge-discharge operation, the value of resistance at a frequency of 1 kHz was measured using an impedance analyzer (SP-150 manufactured by Biologic).

negative electrodes 18 and 19 in which B'-1 and B'-2, which are fibrous nanocarbon materials having shorter average fiber lengths, are respectively used have poor binding properties, and the cell impedance and the charge-discharge cycle characteristics of the lithium secondary batteries of Comparative Examples 1 and 2 produced using these negative electrodes are poor.

It can also be seen that the negative electrodes 20 and 21 in which no fibrous nanocarbon materials are used have poor binding properties, and the battery performance of the lithium secondary batteries of Comparative Examples 3 and

TABLE 2

|  | Example 1 Negative electrode 1 | Example 2 Negative electrode 2 | Example 3 Negative electrode 3 | Example 4 Negative electrode 4 | Example 5 Negative electrode 5 | Example 6 Negative electrode 6 | Example 7 Negative electrode 7 | Example 8 Negative electrode 8 |
|---|---|---|---|---|---|---|---|---|
| Polyurethane | A-1 | A-2 | A-3 | A-4 | A-3 | A-3 | A-3 | A-3 |
| Fibrous nanocarbon material | B-1 | B-1 | B-1 | B-1 | B-2 | B-2 | B-3 | B-4 |
| Negative electrode active material | C-1 | C-1 | C-1 | C-1 | C-1 | C-1 | C-1 | C-1 |
| Conductive assistant | D-1 | D-1 | D-1 | D-1 | D-1 | D-1 | D-1 | D-1 |
| Dispersant and binder | E-1 | E-1 | E-1 | E-1 | E-1 | E-2 | E-1 | E-1 |
| Binding properties evaluation | 4 | 5 | 5 | 4 | 5 | 5 | 4 | 4 |
| Cell impedance | 185 | 180 | 177 | 181 | 175 | 174 | 187 | 189 |
| Charge-discharge cycle characteristics | 85 | 88 | 93 | 90 | 95 | 96 | 84 | 82 |

|  | Example 9 Negative electrode 9 | Example 10 Negative electrode 10 | Example 11 Negative electrode 11 | Example 12 Negative electrode 12 | Example 13 Negative electrode 13 | Example 14 Negative electrode 14 | Example 15 Negative electrode 15 | Example 16 Negative electrode 16 | Example 17 Negative electrode 17 |
|---|---|---|---|---|---|---|---|---|---|
| Polyurethane | A-3 | A-3 | A-3 | A-3 | A-3 | A-3 | A-3 | A-3 | A-3 |
| Fibrous nanocarbon material | B-5 | B-6 | B-1 | B-1 | B-1 | B-1 | B-1 | B-1 | B-1 |
| Negative electrode active material | C-1 | C-1 | C-2 | C-3 | C-4 | C-5 | C-6 | C-7 | C-8 |
| Conductive assistant | D-1 | D-1 | D-1 | D-1 | D-1 | D-1 | D-1 | D-1 | D-1 |
| Dispersant and binder | E-1 | E-1 | E-1 | E-1 | E-1 | E-1 | E-1 | E-1 | E-1 |
| Binding properties evaluation | 4 | 4 | 5 | 5 | 5 | 5 | 5 | 5 | 5 |
| Cell impedance | 190 | 192 | 174 | 185 | 182 | 184 | 186 | 187 | 189 |
| Charge-discharge cycle characteristics | 81 | 80 | 97 | 85 | 90 | 88 | 85 | 83 | 80 |

|  | Comparative Example 1 Negative electrode 18 | Comparative Example 2 Negative electrode 19 | Comparative Example 3 Negative electrode 20 | Comparative Example 4 Negative electrode 21 | Comparative Example 5 Negative electrode 22 |
|---|---|---|---|---|---|
| Polyurethane | A-1 | A-1 | A-1 | A-1 |  |
| Polyacrylic acid |  |  |  |  | A'-1 |
| Fibrous nanocarbon material | B'-1 | B'-2 | — | — | B-1 |
| Negative electrode active material | C-1 | C-1 | C-1 | C-1 | C-1 |
| Conductive assistant | D-1 | D-1 | D-1 | D-2 | D-1 |
| Dispersant and binder | E-1 | E-1 | E-1 | E-1 | E-1 |
| Binding properties evaluation | 3 | 3 | 3 | 3 | 1 |
| Cell impedance | 265 | 280 | 310 | 330 | 290 |
| Charge-discharge cycle characteristics | 62 | 53 | 35 | 22 | 71 |

It can be seen from Table 2 that as compared to the negative electrodes 1 to 17 used in Examples 1 to 17, the 4 produced using these negative electrodes is worse than the battery performance of Examples 1 to 15.

It can further be seen that the negative electrode 22 in which sodium polyacrylate is used in place of aqueous polyurethane dispersions also have poor binding properties, and the battery performance of the lithium secondary battery of Comparative Example 5 produced using this negative electrode is poor.

INDUSTRIAL APPLICABILITY

The electrode binder composition of the present invention can be used as a binder for, for example, an active material used to produce an electrode of a power storage device, and the electrode produced using the electrode binder composition is used to produce various power storage devices. The power storage devices produced can be used for various portable devices such as cellular phones, notebook computers, personal digital assistants (PDA), video cameras, and digital cameras and, furthermore, can be used as medium-sized and large-sized power storage devices mounted in power-assisted bicycles, electric vehicles, and others.

The invention claimed is:

1. An electrode binder composition comprising (A) a polyurethane, (B) a fibrous nanocarbon material having an average fiber length of 0.5 μm or more, (C) water, and (D) a cellulose material,
    wherein the polyurethane is obtained by reacting together
        (a) a polyisocyanate, (b) a polyol, (c) a compound having one or more active hydrogen groups and a hydrophilic group, and (d) a chain extender, and
        (b) the polyol contains an olefinic polyol having 1.5 or more active hydrogen groups and/or a carbonate diol having less than 6 carbon atoms between carbonate bond chains,
    wherein a content ratio of (A) the polyurethane to (B) the fibrous nanocarbon satisfies (A) polyurethane: (B) fibrous nanocarbon=60:40 to 99.6:0.4 (mass ratio), and
    wherein the amount of (D) the cellulose material is 5 parts by mass or more and 150 parts by mass or less relative to 100 parts by mass of (B) the fibrous nanocarbon.

2. The electrode binder composition according to claim 1, wherein (D) the cellulose material comprises a carboxymethylcellulose salt and/or a nanocellulose fiber.

3. The electrode binder composition according to claim 1, wherein (B) the fibrous nanocarbon material comprises one or more selected from single-walled carbon nanotubes, multi-walled carbon nanotubes, and nanocarbon fibers.

4. The electrode binder composition according to claim 1, wherein the olefinic polyol comprises one or more selected from polybutadiene polyol, polyisoprene polyol, hydrogenated polybutadiene polyol, and hydrogenated polyisoprene polyol.

5. The electrode binder composition according to claim 1, wherein (a) the polyisocyanate contains an alicyclic isocyanate and/or an aromatic isocyanate.

6. An electrode coating liquid composition comprising the electrode binder composition according to claim 1.

7. A power storage device electrode comprising an electrode mixture layer containing a solid of the electrode coating liquid composition according to claim 6.

8. A power storage device comprising the power storage device electrode according to claim 7.

* * * * *